G. CRAMTON.
Draft Equalizer.

No. 94,718.

Patented Sept. 14, 1869.

Witnesses:
Albert Patch
Otto L. Johnson

Inventor:
Giby Cramton

United States Patent Office.

GILES CRAMTON, OF MARSHALL, MICHIGAN.

Letters Patent No. 94,718, dated September 14, 1869.

IMPROVEMENT IN THREE-HORSE EQUALIZER.

The Schedule referred to in these Letters Patent and making part of the same.

*To all whom it may concern:*

Be it known that I, GILES CRAMTON, of the city of Marshall, in the county of Calhoun, and State of Michigan, have invented a new and useful Improvement in the Chain-Bearing Sheaves used to equalize the draught of three horses, which improvement I denominate an equalizing scroll-sheave; and I do hereby declare the following to be a full, clear, and exact description of the same, reference being had to the annexed drawings, making a part of this specification, in which—

Figure 1:
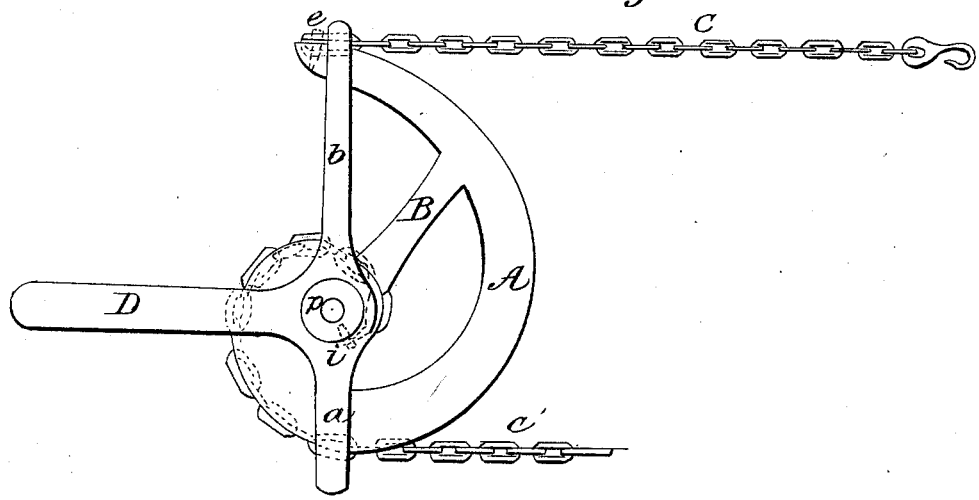
Figure 2:
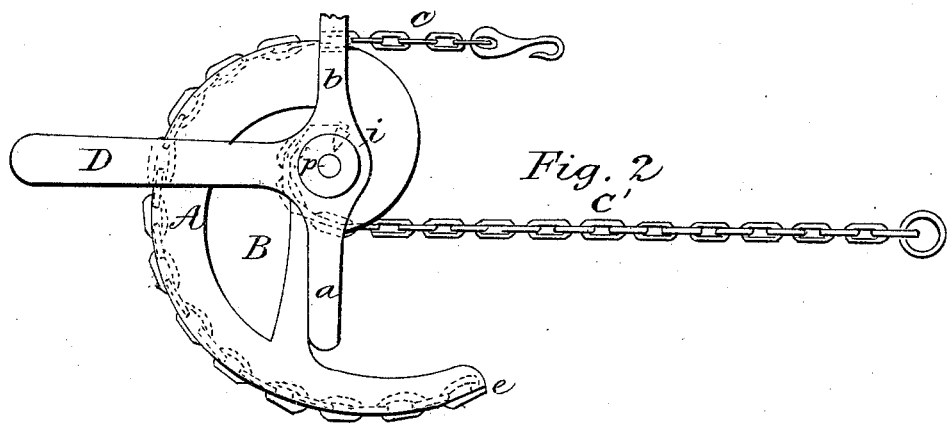

Figures 1 and 2 represent my equalizing-sheave in side elevation at the extreme points of its vibration.

The nature of my invention consists in constructing the draught-chain sheave in the form of a scroll or volute, so that a continuous equalizing bearing may be had on the entire convex surface; and The better to enable others skilled in this art to construct my invention, I will proceed to describe it.

The body of my scroll-sheave is exhibited at A, and consists of a scroll-shaped cast-metal bar, the convex edge or perimeter commencing at a point, $e$, of greatest leverage or distance from the centre of vibration at $p$, and continuing to decrease that distance, by a gradually-diminishing curve, until the convex edge terminates at or about the point $i$.

A groove, the bottom of which is indicated by the broken lines, is sunk around the convex edges or perimeter, as just described.

The draught-chain C of the single middle horse in the team passing, as the sheave vibrates, in that portion of the groove formed in the circles of largest radius, and is attached to the sheave in any convenient manner at the point $e$, and the chain C', which is hitched to the double-tree of the two outside horses of the team, winds around the small circles, or the eye of the scroll as it were, and is secured to the sheave at the extreme inner end of the groove, near the pivot-centre, in any suitable way.

The manner of developing volute or scroll lines is well understood by good mechanicians, and it will be enough to say that when the curve of chain-bearing in my sheave is properly delineated, any point in the curve over which the chain C of the single middle horse winds or unwinds, will, if measured in a line passing through the centre of vibration, be twice the distance from said centre, that the point opposite is, in the portions of the curve, carrying the draught-chain C', which is hitched to a double-tree, (not shown,) provided with a whiffletree at each end, to which the two outside horses are connected.

A double brace-bar, B, may be cast on the scroll-sheave, to stiffen it, and act incidentally as a guard, to keep the chain C' in place, but this is not of indispensable importance.

D represents a clevis-iron, furnished with branches $a$ and $b$, inside of which I hang my equalizing-sheave by the pivot-bolt $p$, so as to revolve or vibrate freely until stopped in one direction by the ring of the chain C', and by the brace-bars B in the other.

These branches to the clevis are very convenient, as they form excellent guards to keep the chains in place, but my scroll-sheave may be hung and connected by ordinary clevis-connections to the plow or other thing to be drawn, if deemed best.

It will be readily seen that with this scroll-formed bearing for the draught-chains, arranged as described, the single horse of the team will at all times be within the vibrating arc, and, by reason of his continuous double chain-bearing leverage, exert as much power (other things being equal) as can be exerted conjointly by the two horses pulling on the same chain C'.

There are other equalizing-devices in use, arranged to operate with a three-horse team, as mine is, and in which the chains bear on concentric half-circles of a relative radius as two to one; nor is it new to work the chain on eccentric arcs; but the distinguishing feature in my invention is that my equalizing-groove for the chains extends from the point of greatest radius, in one unbroken diminishing curve, around the vibrating centre or around the hub or eye, as it may be called, of the scroll. This utilizes the whole of a much increased extent of chain-bearing, gives much larger vibrations, allowing the team free play to come and go where it will be less likely to shirk duty, by one of its members lagging just sufficiently behind to get blocked, and imposing the whole labor on the others.

These important advantages are not obtained at the expense of enlarging or rendering more cumbrous the operating-device, for my scroll-sheave is as compact and light as any of the devices alluded to where the periphery alone of each semicircle is employed.

I do not claim the principle on which this equalizer works, for, as stated above, this is not new; but

Having thus described my invention,

What I claim, and desire to secure by Letters Patent, is as follows:

1. A draught-chain sheave, A, made in the form of a scroll, with an equalizing-groove for the chains, extending from the point of greatest radius, in one unbroken diminishing curve, around the eye of the scroll, whereby the whole of a much-increased extent of chain-bearing is utilized, giving much larger vibrations, and allowing the team free play to come and go without "fetching up," or shirking duty, substantially as herein described.

2. In combination with the scroll-sheave A, constructed substantially as described, the clevis D, with guards $a\ b$, to keep the chains in place, substantially as set forth.

3. The equalizer herein described, composed essentially of the scroll-sheave A, draught-chains C C', and clevis D, with guards $a\ b$, all constructed and arranged substantially as set forth.

GILES CRAMTON.

Witnesses:
ALBERT PATCH,
OTTO L. JOHNSON.